United States Patent [19]

Ha

[11] Patent Number: 4,770,054
[45] Date of Patent: Sep. 13, 1988

[54] APPARATUS FOR PROVIDING LIMITED BACKLASH ROTATION OF A TRANSMISSION FOR A VEHICLE

[76] Inventor: Jung Y. Ha, #1624-1, Bongcheon 7-dong, Kwanak-ku, Seoul, Rep. of Korea

[21] Appl. No.: 923,134

[22] Filed: Oct. 24, 1986

[30] Foreign Application Priority Data

Oct. 24, 1985 [KR] Rep. of Korea ............... 85-7870

[51] Int. Cl.⁴ .................... F16H 55/18; F16D 15/00
[52] U.S. Cl. ............................. 74/409; 192/45.1; 192/106.2
[58] Field of Search ............... 192/45.1, 106.2, 41 A; 74/409

[56] References Cited

U.S. PATENT DOCUMENTS

| | | | |
|---|---|---|---|
| 1,788,317 | 1/1931 | Morier et al. | 192/45.1 |
| 1,986,160 | 1/1935 | Pomeroy | 192/45.1 |
| 2,743,803 | 5/1956 | Ferris | 192/45.1 |
| 4,530,673 | 7/1985 | Lamarche | 192/106.2 |
| 4,613,029 | 9/1986 | Beccaris | 192/106.2 |

FOREIGN PATENT DOCUMENTS

| | | | |
|---|---|---|---|
| 0765951 | 1/1957 | United Kingdom | 192/67 R |
| 1233273 | 5/1971 | United Kingdom | 192/106.2 |

Primary Examiner—Leslie A. Braun
Assistant Examiner—Scott Anchell
Attorney, Agent, or Firm—Birch, Stewart, Kolasch & Birch

[57] ABSTRACT

Backlash preventing apparatus for a transmission for a vehicle having an outer race fixed to a body, an inner face fixed to a driving shaft, and a ball bearing disposed therebetween. A roller clutch is provided having a plurality of inclined grooves mounted between the outer race and the inner race. A backlash preventing roller is located in the inclined grooves. A first support spring and a support pin are inserted within an inclined spring hole formed adjacent to a corner of the inclined groove. A small roller is inserted into a gap formed between the roller clutch and the inner race, and a second support spring and pin are mounted between the roller clutch and inner race. The backlash preventing apparatus enables the inner race to rotate in a first direction and provides limited backlash rotation in a reverse direction.

4 Claims, 3 Drawing Sheets

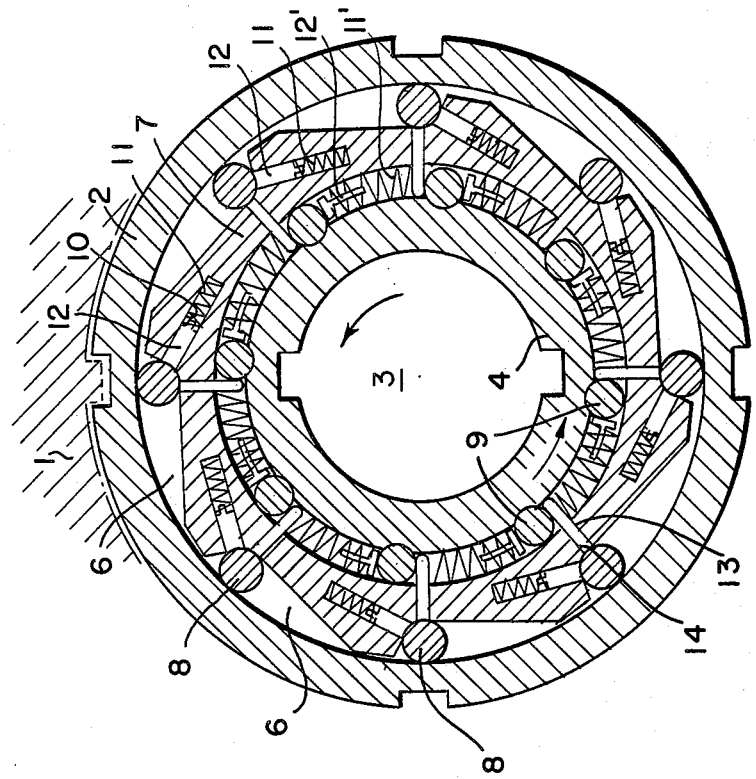
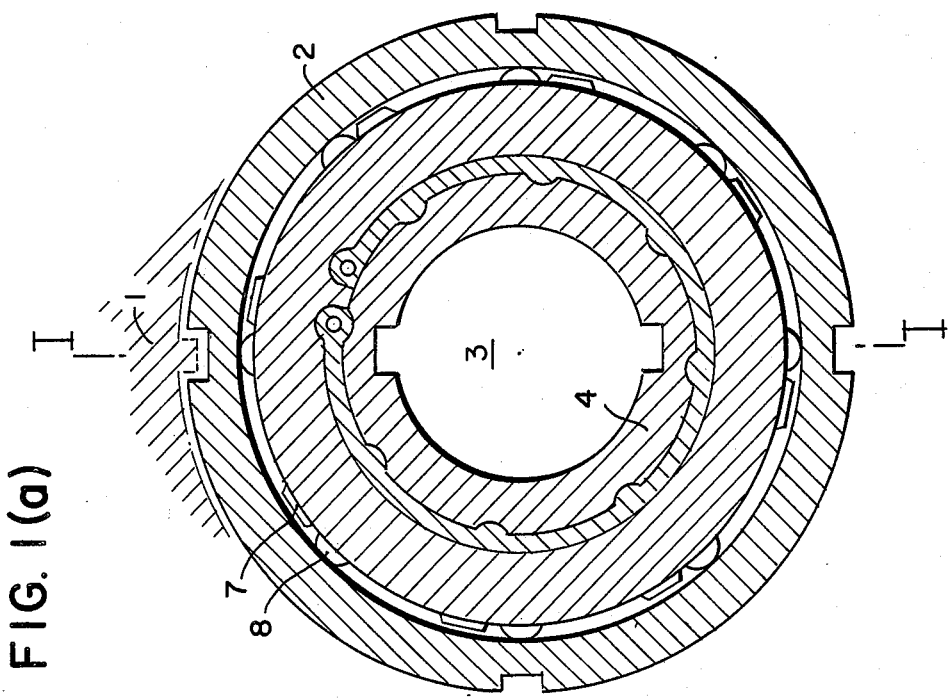

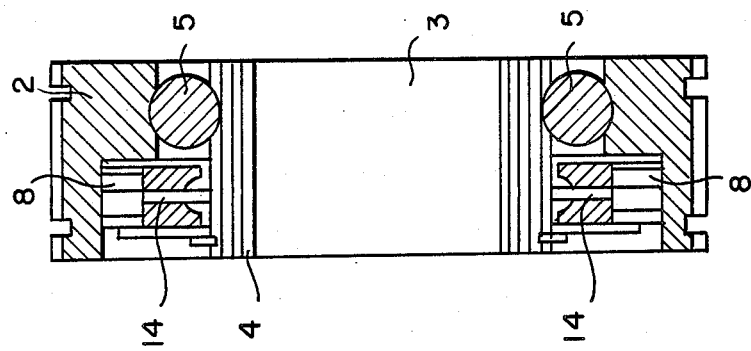
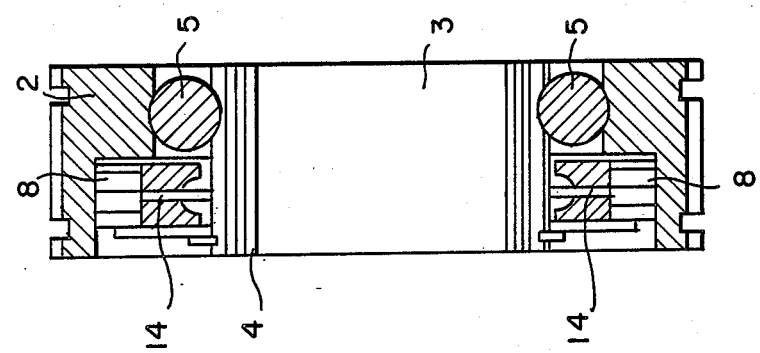

APPARATUS FOR PROVIDING LIMITED BACKLASH ROTATION OF A TRANSMISSION FOR A VEHICLE

BACKGROUND OF THE INVENTION

1. Field of the Invention

The present invention relates to an apparatus for preventing backlash of a transmission for a vehicle, and in particular, a new and useful bearing for preventing backlash of a transmission in which a gear is mounted on a driving shaft which can smoothly mesh with another gear mounted on a passive shaft.

2. Description of Background Art

In the past, backlash preventing bearings, such as a roller clutch, over running clutch or over running roller clutch, were used so that a transmission rotates in only one direction. The rotation of the transmission in the opposite direction cannot be achieved.

Therefore, in a gear assembly of which the driving shaft gear is fixed to mesh with the passive shaft gear, the bearing can properly prevent backlash of the transmission of the vehicle. However, when the passive shaft is not rotated, in the case when the passive shaft gear must be meshed with the driving shaft gear, the probability that the driving gear will properly mesh with the passive gear to be rotated as compared with the probability that the driving gear will not properly mesh with the passive gear to be rotated is approximately fifty percent.

That is, in the case where the passive gear being meshed with the driving gear is stopped, the teeth of the passive gear and the teeth of the driving gear are not meshed exactly with each other. Sometimes each gear is met with free ends of the teeth so that power cannot be transmitted from the driving gear to the passive gear.

The above problems are raised because there is no relative clearance for moving between the driving gear and the passive gear. No clearance between the gears cause the teeth of the gears to be exactly meshed or not exactly meshed according to the condition of the mating of the teeth.

Therefore, in the backlash preventing apparatus of the prior art constructed as above, it is difficult for the teeth of gears to be exactly meshed in the condition when the passive gear is stopped.

SUMMARY AND OBJECTS OF THE INVENTION

An object of the present invention is to provide a backlash preventing apparatus for a transmission which prevents the backlash of the transmission and which can be adapted to various power transmission apparatus, i.e., a transmission of a motorcycle, automobile, ship, etc.

Another object of the present invention is to provide a backlash preventing apparatus for a transmission having a gear assembly mounted on the driving shaft and a passive shaft which can be effectively meshed under any conditions. With the above object in view, the backlash preventing apparatus of the transmission in accordance with the present invention comprises a roller clutch having a plurality of inclined grooves which are mounted between an outer race and an inner race. A backlash preventing roller is located in the inclined grooves one by one between the roller clutch and the outer race. A first supporting spring and a supporting pin for supporting the backlash preventing roller are inserted in a groove formed on the outer surface of said roller clutch. A small roller is fitted between the roller clutch and the inner race. A second supporting spring and a pin for supporting the small roller are located in the gap formed by the small roller between the roller clutch and the inner race.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1(a) is a side view of an apparatus in accordance with the present invention, with positive rotation of the transmission;

FIG. 1(b) is a side cross-sectional view;

FIG. 1(c) is a cross section taken along line I—I of FIG. 1(a);

FIG. 2(c) is a cross section taken along line II—II of FIG. 2(a).

DESCRIPTION OF THE PREFERRED EMBODIMENTS

Figure 2B:
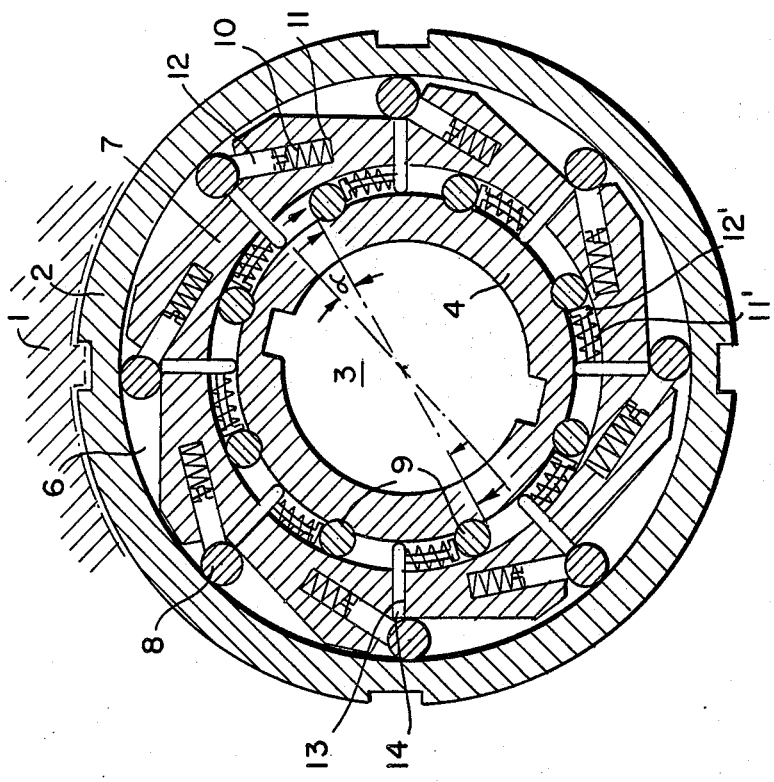
FIG. 2(b) is a side cross-sectional view.

FIGS. 1(a), 1(b) and 1(c) show an apparatus in accordance with the present invention which is in the state of positive rotation. The backlash preventing apparatus for a transmission for a vehicle in accordance with the present invention comprising a roller clutch 7 having a plurality of inclined grooves 6 which are mounted between an outer race 2 and inner race 4. Backlash preventing rollers 8 are placed in the inclined groove 6 one by one between the roller clutch 7 and the outer race 2. A first supporting spring 11 and a supporting pin 12 for supporting the backlash preventing roller inserted in a groove are formed on the outer surface of the roller clutch 7. A small roller 9 is fitted between the roller clutch 7 and inner race 4. A second supporting ring 11' and a second supporting pin 12' are provided for supporting the small roller 9 located in the gap formed by the small roller 9 between the roller clutch 7 and the inner race 4.

Referring to the FIG. 1(b), an inner race 4 fixed on a driving shaft 3 is mounted on the inside of an outer race 2 fixed to body 1 of a transmission. The inner race 4 can be freely rotated on the driving shaft 3, so that the inner race 4 can transfer the power from an engine to the outer race 3. All parts except for the outer race 2 fixed to the body 1 are freely movable in a counterclockwise direction. Namely, as the driving shaft 3 is rotated in the counterclockwise as shown in FIG. 1(b), the inner race 4 is also rotated together with the driving shaft 3 in the counterclockwise direction. At this time, a small roller 9 between the inner race 4 and a roller clutch 7 pushes a lower part of a spring stopper 14 inserted in a pin insertion hole 13 of a roller clutch 7, so that the roller clutch 7 is rotated in the counterclockwise direction with the inner race 4. Due to the rotation of the roller clutch 7, a backlash preventing roller 8 located in an inclined groove 6 of the roller clutch 7 is rotated in the opposite direction against the rotating direction of roller clutch 7.

The roller 8 pushes and compresses a first support spring 11 and a support pin 12 which is in the inclined spring hole 10 and is moved to the deepest portion of the inclined groove 6, so that the distance between the backlash preventing roller 8 and the outer race 2 is increased. The driving shaft 3 can be rotated with the inner race 4 and the roller clutch 7 which is located in the deepest portion of the inclined groove 6. Namely, when said driving shaft 3 is rotated in the counterclockwise direction, the backlash preventing roller 8 is slipped and rolled along the inner surface of the outer race 2 between the roller clutch 7 and body 1.

Figure 2A:
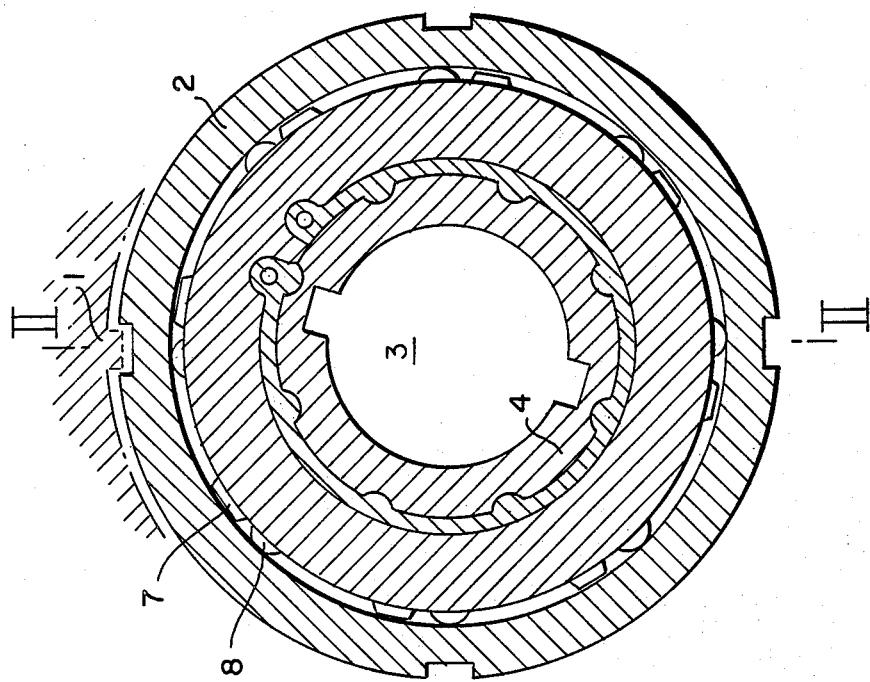
FIG. 2(a) is a side view of an apparatus in accordance with the invention with reverse rotation of the transmission.

Referring to FIGS. 2(a), 2(b) and 2(c), a reverse direction as compared to FIGS. 1(a), 1(b) and 1(c) are illustrated. FIGS. 2(a), 2(b) and 2(c) show the stop state of the driving shaft 3 after a little backlash of the driving shaft 3. At the stop state of shaft 3, when a first gear (not shown) mounted on the shaft 3 is meshed with a second gear mounted on the passive shaft (not shown), the second gear on the nonrotated passive shaft can be easily meshed with the first gear on the driving shaft 3.

In operation, the first gear mounted on the shaft 3 is released from the second gear on the passive shaft by reason of speed change. After the operation of speed change is completed, the first gear is again meshed with the second gear. At the time when the free end of the teeth of the first gear meet with the second gear, the shaft 3 is turned in the reverse direction about α degree to provide a gap with respect to the first gear to allow backward rotation of the first gear.

The backward rotation of the first gear can allow the first gear on the driving shaft 3 to exactly mesh with the second gear on the passive shaft. The backward movement of the first gear results from the reaction between the teeth of the gears. Therefore, even if the state of the second gear is nonrotating, the first gear on the driving gear connected to the transmission gear box can easily mesh with the second gear on the passive shaft.

In addition, when the shaft 3 is backlashed by the load of an inverse direction, the backlash preventing roller 8 is pushed to a narrow width by means of elastic force of a first support spring 11 inserted in the inclined spring hole 10. At the same time, as the roller clutch 7 is rotated in a clockwise direction with the shaft 3 as shown in FIG. 2(b), the backlash preventing roller 8 is rotated in the counterclockwise direction so that the backlash preventing roller 8 functions as a key between the outer race 2 and roller clutch 7 at the narrow width of the inclined groove 6. Thus, the shaft 3 cannot be rotated in the backward direction so that the backlash of transmission can be prevented.

Referring to FIG. 1(c) and FIG. 2(c), a ball bearing 5 between outer race 2 and inner race 4 does not have to be interposed therebetween.

The invention being thus described, it will be obvious that the same may be varied in many ways. Such variations are not to be regarded as a departure from the spirit and scope of the invention, and all such modifications as would be obvious to one skilled in the art are intended to be concluded within the scope of the following claims.

What is claimed is:

1. Backlash preventing apparatus for a transmission for a vehicle having an outer race fixed to a body, and an inner race fixed to a driving shaft for rotating in a first direction characterized in that said backlash preventing apparatus includes:
   a roller clutch having a plurality of inclined grooves mounted between the outer race and the inner race;
   a backlash preventing roller located in each of the inclined grooves;
   a first support spring and a support pin inserted within each inclined spring hole formed adjacent to a corner of the inclined groove for biasing said backlash preventing rollers;
   a plurality of small rollers inserted into a gap formed between the roller clutch and the inner race; and
   a second support spring and pin mounted between said roller clutch and inner race for normally biasing each of said small rollers in said first direction;
   wherein said backlash preventing rollers enable said inner race to rotate in a first direction and provides limited backlash rotation in a reverse direction.

2. Backlash preventing apparatus according to claim 1, wherein said inclined grooves increase in size on the outer peripheral surface of said roller clutch in said reverse direction.

3. Backlash preventing apparatus according to claim 1, wherein each of said first support spring and support pin normally bias said backlash preventing roller in said first direction.

4. Backlash preventing apparatus according to claim 1, and further including pin insertion holes disposed within said roller clutch adjacent to the positioning of each of said backlash preventing rollers and a spring stopper disposed within each of said pin insertion holes for engaging said small rollers during rotation of said first direction.

* * * * *